June 17, 1924.

A. V. VERVILLE 1,498,000

TRUSS DESIGN FOR MULTIMOTORED AIRCRAFT

Filed April 18, 1922   2 Sheets-Sheet 1

Inventor
A. V. Verville
By Robert H. Young
Attorney

Patented June 17, 1924.

1,498,000

UNITED STATES PATENT OFFICE.

ALFRED V. VERVILLE, OF DAYTON, OHIO.

TRUSS DESIGN FOR MULTIMOTORED AIRCRAFT.

Application filed April 18, 1922. Serial No. 555,306.

*To all whom it may concern:*

Be it known that I, ALFRED V. VERVILLE, a citizen of the United States, residing at Dayton, in the county of Montgomery and State of Ohio, have invented certain new and useful Improvements in Truss Designs for Multimotored Aircraft, of which the following is a specification.

This invention relates in general to multimotored aircraft of the larger type and more specifically to a trussing system common to both the landing gear and supporting surfaces or wings.

The object of this invention is to reduce the number of exposed struts and wiring and the parasite head resistance caused thereby, without correspondingly reducing the strength of the truss. To this end it is proposed to mount the fuselage of the aircraft intermediate the supporting surfaces thereof in such a manner that the truss for the inner bays will be free from wires, but will consist in N struts extending fore and aft, and struts extending diagonally from the upper end of the inner vertical strut to the point of connection of the fuselage to the lower wing. The truss between the fuselage of the upper wing will consist in a plurality of struts extending diagonally from either side of the fuselage to a central point of convergence to their connection to the upper wing. It is also proposed to apply this system over truss design in the landing gear.

With the foregoing and other objects which shall appear as the description proceeds, the present invention resides in the combination of parts and in the details of construction hereinafter described and claimed, the specific embodiment being illustrated in the accompanying drawings, in which:

Figure 1:
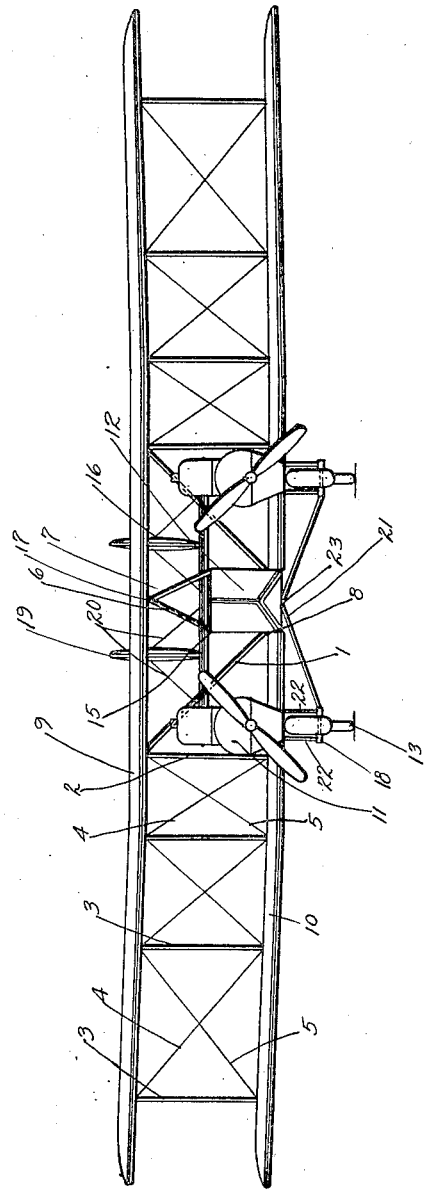
Figure 1 is a front elevation of a multimotored aircraft, showing the truss design for supporting the wings and landing gear upon the fuselage.

Referring more particularly to the drawings, the truss is constructed of two or more vertical N struts 2, the ends of said struts being connected to flying or landing wires 4 and 5. In the inner bay next to the fuselage, the usual flying and landing wires are replaced by the struts 1, thus present a strong and rigid construction and eliminate a complicated system of bracing wires below the connection of the strut 2 to the lower wing 10 at a point 8. It is understood that the strut 1 will be so constructed and mounted that it will act equally as well as a compression or tension member in withstanding any normal strain thrust upon it.

The upper wing 9 is connected to the fuselage 12 by means of a strut having component parts 6 and 7 connected to the fuselage 12 at 15 and 16 and connected to the upper wing 9 at 17. Numerals 19 and 20 represent the rudder and control wires therefor respectively.

By this construction there is eliminated in both inner bays, all flying and landing wires and also the usual wires for bracing the struts connecting the upper wing to the fuselage. It will be readily seen that this will present a strong and more rigid truss construction, more easily assembled with fewest adjustments from time to time, and furthermore considerably reduce the head resistance caused by the presence and vibration of such wires in the conventional type of aircraft.

Figure 2:
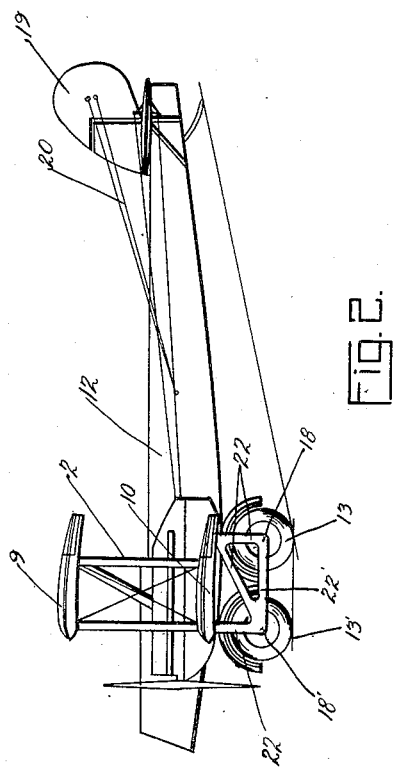
Figure 2 is a side view of the same.

The advantages of an auxiliary set of landing wheels placed forwardly of the main landing wheels are well known. As more clearly shown in Figure 2 the two sets of wheels are so placed with relation to each other that both sets rest on the ground when the fuselage is parallel to the ground. When the rear end of the fuselage rests on the tail skid the front wheels will obviously be elevated from the ground.

Figure 4:
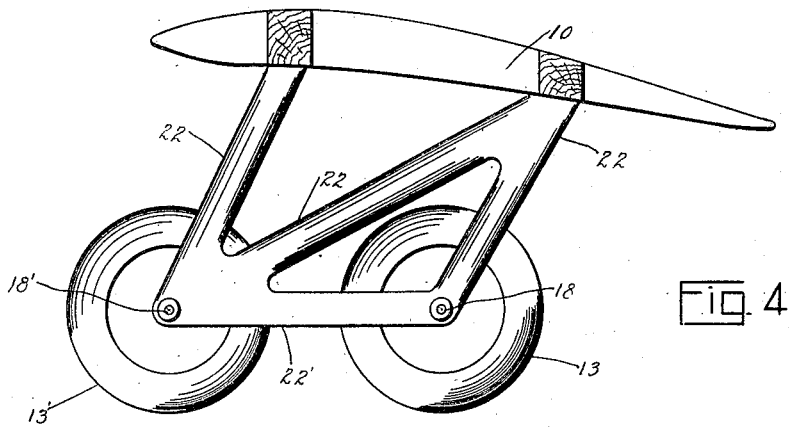
Figure 4 is a side view of the N type of landing gear to be used in case a dual set of wheels is used.

Referring to Figure 4, 10 represents the lower wing of the aircraft. An N strut 22, having its three component parts integral with each other, is provided with a bracing member 22" also integral therewith. The strut landing gear construction is connected in any suitable manner to the lower wing and to the axles 18 and 18', of the landing wheels 13 and 13' respectively. It will be readily seen that by this arrangement there is provided a strong rigid landing gear construction which will be easily assembled and which will require the minimum amount of adjustment from time to time as there are no wires or the like present.

A shown in Figure 1, these N struts 22 are arranged on either side of each landing gear or set of landing wheels. A lateral cross bracing member 21 extends from one set of wheels to a lower point 23 of the fuselage and then to the other set of landing wheels on the opposite side of the fuselage.

Figure 5:
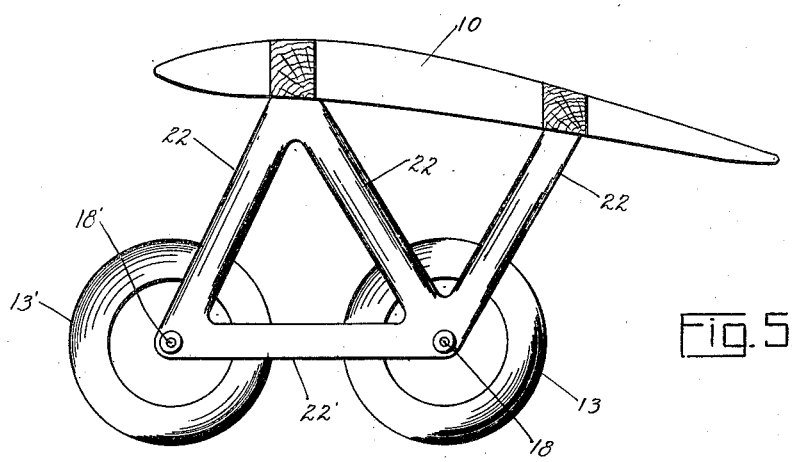
Figure 5 is a similar view of a modified form of the landing gear shown in Figure 4.
Figure 3:
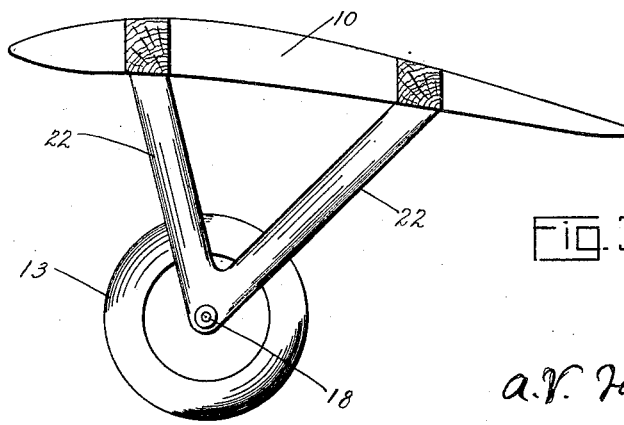
Figure 3 is a side view of the V type landing gear to be used in case a single set of landing wheels are employed.

Figure 5 merely shows the N struts as applied reversely of that form shown in Figure 4, while Figure 3 illustrates a V type of landing gear which is to be used in connection with an aircraft using a single set of wheels.

Having thus described my invention, I claim:

1. In combination with the upper and lower planes of an airplane, a fuselage body substantially between said upper and lower planes, an inverted V-shaped strut linking said fuselage body with said upper plane, wing struts on either side of said fuselage body, and diagonal flying and landing struts between said wing struts and said fuselage body.

2. In combination with the upper and lower planes of an airplane, a fuselage body substantially between said upper and lower planes, an inverted V-shaped strut linking said fuselage body with said upper plane, wing struts on either side of said fuselage body, diagonal flying and landing struts between said wing struts and said fuselage body and connected to the upper ends of said wing struts.

3. In combination with the upper and lower planes of an airplane, a fuselage body substantially between said upper and lower planes, an inverted V-shaped strut linking said fuselage body with said upper plane, wing struts on either side of said fuselage body, diagonal flying and landing struts between said wing struts and said fuselage body and connected to the upper ends of said wing struts, dual landing gear attached to the lower side of said lower plane, and diagonal bracing members for said dual landing gear attached to a point substantially agreeing with the meeting point of said two diagonal wing struts.

In testimony whereof I affix my signature.

ALFRED V. VERVILLE.